June 30, 1959 V. BLANCATO 2,892,315
MARINE PIER FENDER
Filed May 18, 1956 10 Sheets-Sheet 1

Fig.1.

INVENTOR
Virgil Blancato
BY
ATTORNEYS

June 30, 1959 V. BLANCATO 2,892,315
MARINE PIER FENDER
Filed May 18, 1956 10 Sheets-Sheet 4

INVENTOR
Virgil Blancato
BY
ATTORNEYS

June 30, 1959     V. BLANCATO     2,892,315
MARINE PIER FENDER

Filed May 18, 1956     10 Sheets-Sheet 6

United States Patent Office 2,892,315
Patented June 30, 1959

2,892,315

MARINE PIER FENDER

Virgil Blancato, Brooklyn, N.Y.

Application May 18, 1956, Serial No. 586,348

12 Claims. (Cl. 61—48)

(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial No. 490,714, filed February 25, 1955 now abandoned.

Marine pier fenders act as shock absorbers to diminish the force of impact between a large floating object such as a ship, barge or the like and structures such as piers, quays and slips. In general, prior marine pier fenders have been of two types: the driven pile type, and the compression or torsion spring type. Marine pier fenders of the driven pile type utilize a pile-supported fender structure of timber to act as a shock absorber for the sea wall of the pier. The piles, which are driven into the harbor bottom, are costly to install as well as costly to repair and replace. The piles of marine pier fenders of the driven pile type are subjected to large bending moments when the fenders are subjected to the impact of floating bodies, both above and below the water line. These moments tend to dislocate or shear off the piles, and to destroy the fender structure supported by the piles.

Marine pier fenders of the compression or torsion spring type employ shock absorbing springs interposed between the fender and its support such as a pier or the like. Such spring type devices are expensive to make and to install, in addition, the compression or torsion spring type devices tend to lose their resiliency after heavy service and must be replaced. When an appreciable portion of the initial resilience of the spring type devices has been lost, a markedly greater portion of the energy of impact is transmitted from the fender to the support itself, so that there is a correspondingly increased possibility of damage to the support.

Among the objects of the present invention is the provision of an improved shock-absorbing wall-like structure, such as a marine pier fender, which affords greater protection to both the support, such as a pier, and to the floating body, such as a ship, which contacts the fender.

Another object of the present invention is the provision of a marine pier fender characterized by its great shock absorbing qualities and by its pronounced structural durability.

Yet another object of the invention, in preferred embodiments thereof, is the provision of a marine pier fender of simple construction, which is adapted for easy, rapid, and economical installation, and which may be largely prefabricated before its installation.

An additional object of the present invention is the provision of a marine pier fender requiring relatively little maintenance, and in which inspection and maintenance operations are easily and economically carried out.

A still further object of the invention, in preferred embodiments thereof, resides in the provision of a sectional fender in which the sections may move independently of each other to some extent, but are mounted so as to afford substantial continuity of coverage of the supporting structure by the fender, and to provide for the transmission of forces from one section to another so that adjacent sections assist in absorbing the energy of impact on a section of the fender.

Still another object of the invention, in certain embodiments thereof, lies in the provision of a sectional fender having curved sections, such fender being adapted for use with a support such as a pier, sea wall, piles or the like, which have at least a zone thereof presenting an over-all rounded or angular shape in plan.

The above and further objects of the invention will become more readily apparent upon consideration of the following specification describing preferred embodiments of the invention, and of the drawings accompanying the specification and forming a part thereof.

As will be apparent from the above, three embodiments of the fender of the invention are shown and described therein. The first embodiment, shown in Figs. 1–6, inclusive, has a support such as a pier presenting an over-all straight face, the fender associated with such face likewise being straight. In the second embodiment, shown in Figs. 7–11, inclusive, the support presents two sides which lie at an appreciable angle to each other. A position of the fender there shown is curved in plan in order smoothly to cover the angular zone of intersection of the pier. In Figs. 12–15, inclusive, there is shown a third embodiment of the fender of the invention, such structure being adapted for use with a ferry slip. The slip shown has straight sides connected by a smoothly curving end portion.

It is a characteristic of all three embodiments of the fender shown and described herein that the fender, if it has appreciable length, is composed of a number of serially disposed sections or "bents" extending along the outer face of a support or supports. Each section of the fender has at least two vertical holding or support posts, longitudinally extending wales connecting the support posts, and contact members connected to the wales outwardly thereof. In the first embodiment of the fender, such contact members are vertical contact fender members and horizontal chocks interposed between such vertical members. In the second and third embodiments disclosed herein the contact members are relatively closely spaced vertical contact fender or sheeting members.

In the preferred embodiments of the invention herein shown, the sections of the fender are flexibly connected together as by an overlap of the wales and chocks of successive sections (Figs. 1–6). The sections of the fender need not be directly physically connected, but longitudinally extending members such as the wales of adjacent sections may overlap, so that an inward pressure exerted on one section of the fender is transmitted in part, at least in a latter part of the movement of the first section, to at least one adjacent section of the fender (Figs. 7–15). Provision is also made for the transmission of an end thrust from the contacted section to at least one adjacent section, in at least the latter part of longitudinal travel of such contacted section. Each of the sections of the fender thus has a certain amount of freedom of motion, but also eventually forcibly interacts with an adjacent section or sections, so that at least one zone of a fender, comprising a number of sections, eventually acts as a whole, thereby providing greater energy-absorbing capacity.

Proceeding now to a description of a first disclosed embodiment of the fender, the portion of such fender shown in Figs. 1 to 4 is generally designated 10. The fender includes a plurality of vertically disposed contact fender members 11 spaced longitudinally of the fender and having chamfered outer edges 11a and an inclined lower end face 11b. Members 11 are secured to the outer faces of three parallel longitudinally extending vertically spaced wales 12, 14 and 15. To the rear of the wales there are secured vertically disposed support posts 16 which are spaced longitudinally of the fender. In the embodiment shown, each of wales 12, 13 and 14 is made in serially arranged sections, each section extending from generally the center of one support post 16 to the center of the next adjacent support post, the sections of the wales being secured to the support posts as by being bolted thereto. Longitudinally extending chocks 15, having their outer edges chamferred and their outer faces lying somewhat behind the outer face of contact members 11, overlie the outer face of the wales, to which they are secured, and span between adjacent contact members. In the illustrative embodiment shown, contact members 11 lie midway between successive support posts 16.

The above described fender structure, which is associated with and supported by a pier 20, and is movable with respect to the pier by fender-mounting means to be described, may be considered as being composed of a number of serially connected sections or bents. Each such section includes its vertically spaced wale sections, the contact fender member 11 connected to such wale sections, and the portions of the support posts 16 to which the ends of the wale sections are secured. Because the wales are made in sections, and the wales are joined at their ends to the support posts, the connection between adjacent sections of the fender is flexible to a certain degree. The overlapping of the ends of adjacent wale sections by chocks 15 prevents the fender from being unduly flexible in a longitudinal or vertical direction.

Each support 16 is mounted in an upper fender-mounting device in the form of a bracket 17 and a lower fender-mounting device in the form of a bracket 19, the brackets being vertically spaced from each other and secured to the outer generally vertical surface of a supporting structure shown as the pier 20. Such brackets, which will be particularly described in connection with Figs. 3, 5 and 6, allow the fender, when struck by a ship or other object approaching the pier, generally to move to a controlled extent toward the pier. During such movement the fender is caused to move upward against the influence of gravity, so that much of the force of the impact is dissipated. Vertically disposed stop posts 21, spaced from the outer face of pier 20 by filler blocks 22, are located so as to be contacted by the inner faces of the wales when the fender is approximately at the inner end of its travel permitted by the supporting brackets.

Figure 1:
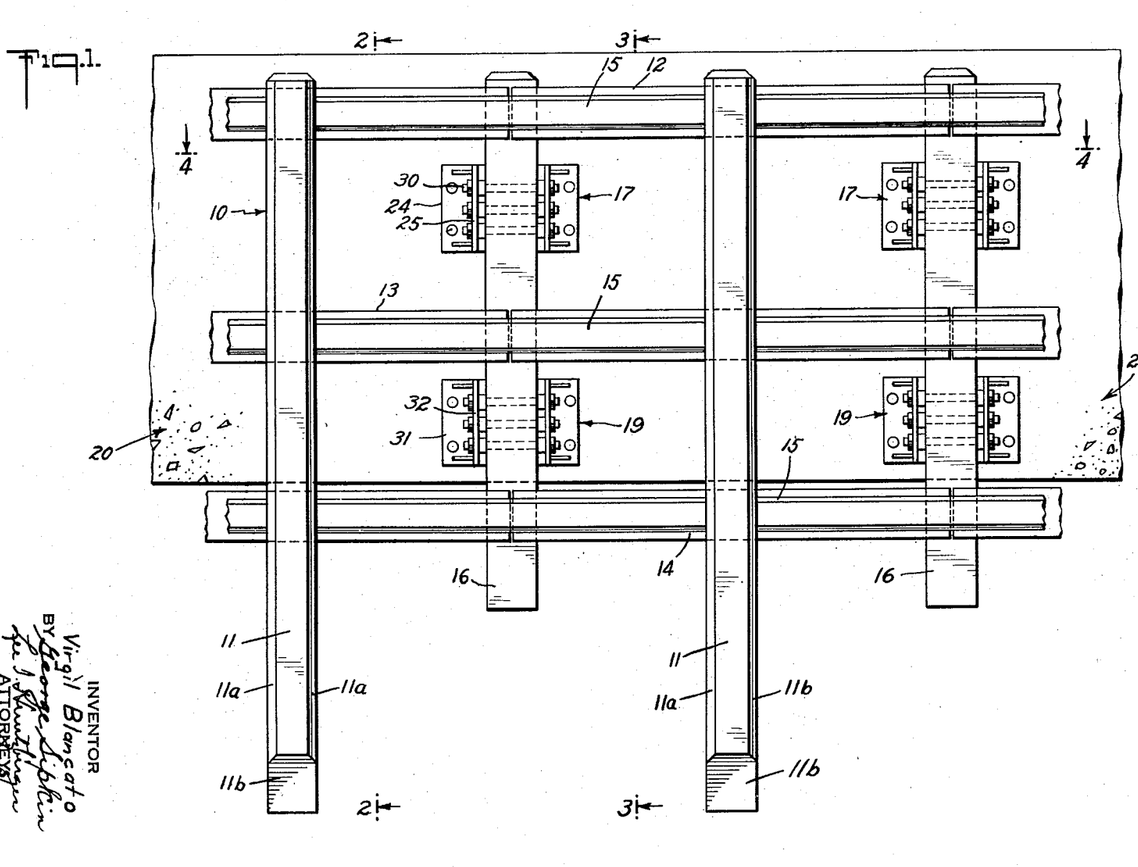
Figure 1 is an elevation of a fragment of a marine pier and a portion of a fender associated therewith, said fender being made in accordance with a first described embodiment of the present invention.
Figure 2:
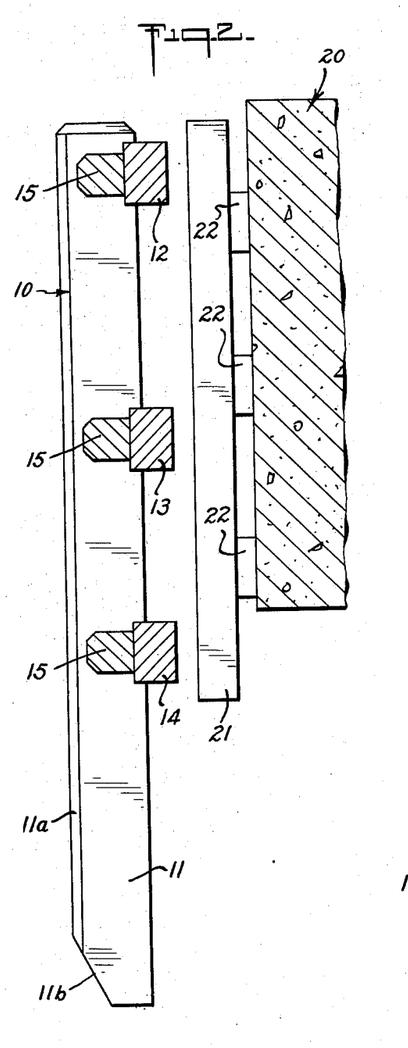
Figure 2 is a vertical section through the porton of the pier and fender shown in Figure 1, the section being taken along the line 2—2 of Figure 1.
Figure 3:
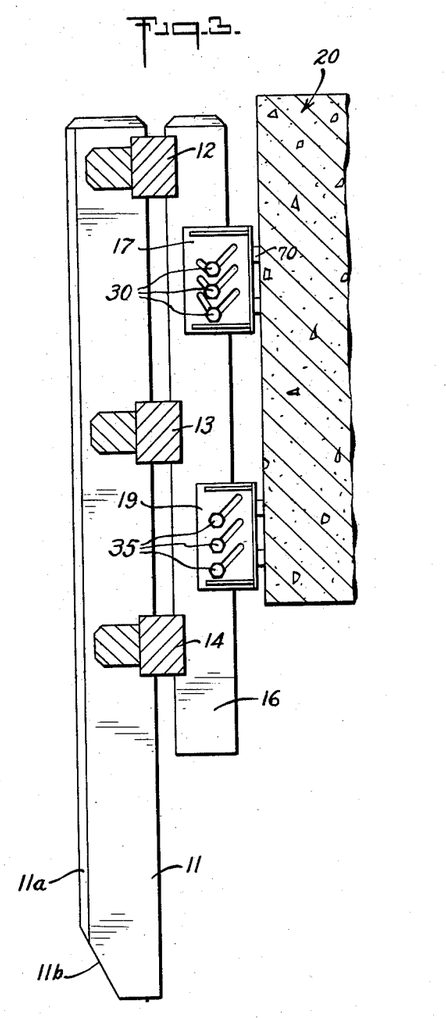
Figure 3 is a vertical section through the pier and the portion of the fender associated therewith in Figure 1, the section being taken along the line 3—3 of Figure 1.
Figure 4:
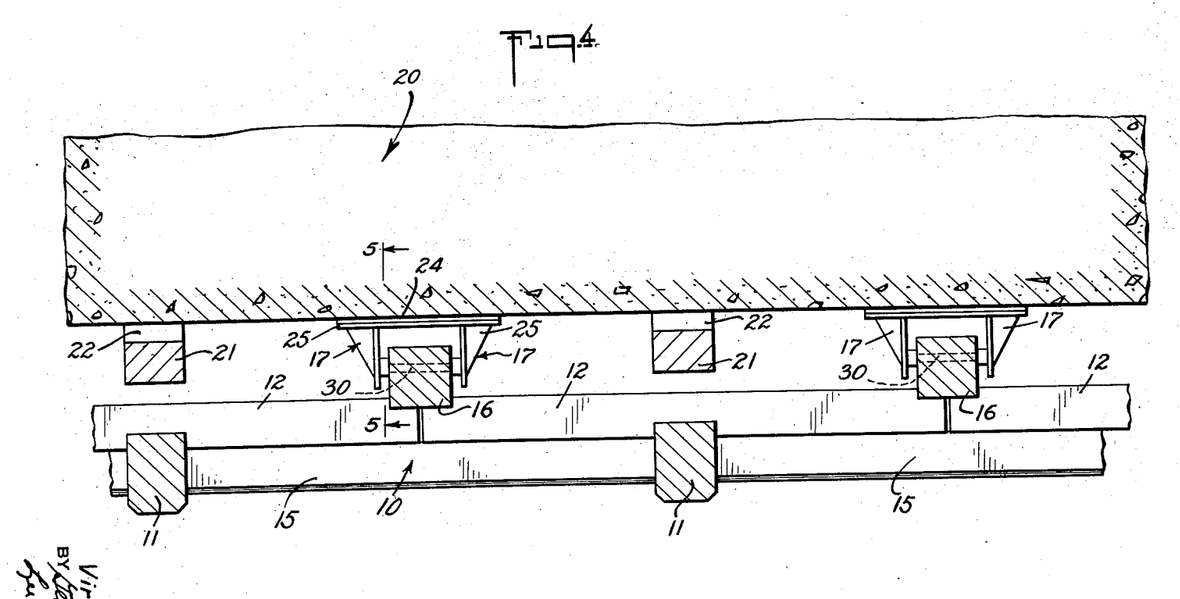
Figure 4 is a horizontal section through the pier and fender of Figure 1, the section being taken along the line 4—4 of Figure 1.
Figure 5:
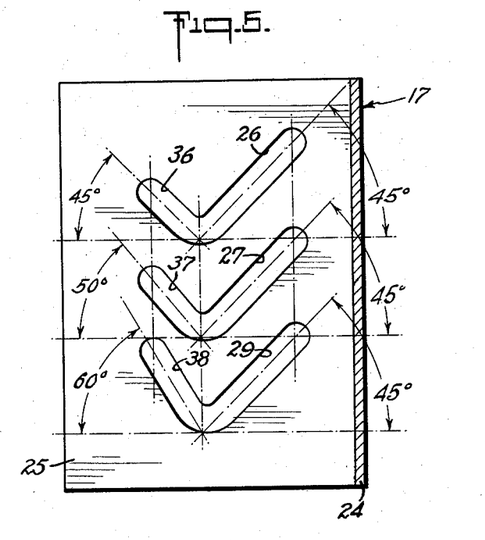
Figure 5 is an enlarged view in section through an upper fender-supporting bracket, the section being taken along the line 5—5 of Figure 4.

The upper bracket 17 is generally of U-shape, having a base 24 overlying and secured against the outer face of pier 20, and two outwardly extending vertical parallel side plates 25. Brackets 17 may be fabricated from channel sections of from heavy gauge metal plates, comprising side plates suitably attached to the base as by being welded thereto, and braced laterally by triangular filler members welded to the base and sides of the bracket, as shown. Each side plate 25 of bracket 17 has a plurality (three being shown) of generally L-shaped slots therein, the lower ends of such slots being vertically aligned. The longer, inwardly extending legs 26, 27 and 29 of the respective slots are parallel and extend from their lower ends upwardly and inwardly toward the pier at a suitable angle, for example, about 45°. The shorter, outwardly and upwardly extending legs of the respective slots are disposed at different angles with respect to the horizontal. In the embodiment shown, top leg 36 is disposed at about 45° with respect to the horizontal, middle leg 37 at an angle of about 50°, and lower leg 38 at an angle of about 60° with respect to the horizontal. A plurality of headed bolts 30, one for each slot, extend between the slots in opposite side plates 25 of bracket 17 and through holes in the support post 16 disposed within such bracket. The bolts are retained by nuts on their threaded ends.

Figure 6:
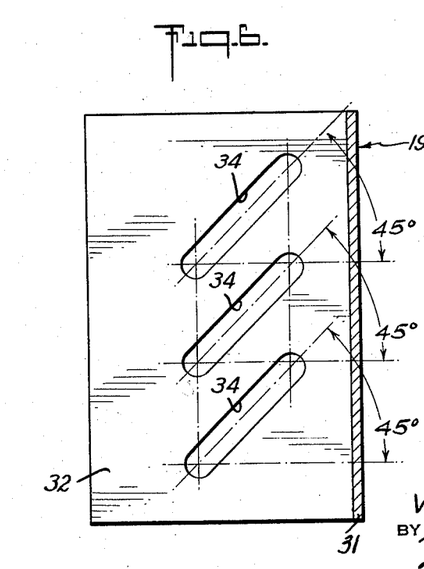
Figure 6 is a view in vertical section through a lower fender-supporting bracket, the section being taken along the line 6—6 of Figure 1.

Each lower bracket 19 is of generally the same shape as upper bracket 17, and is similarly constructed. Bracket 19 has two vertically extending spaced parallel side plates 32, each of such plates having a plurality (three shown) of upwardly and inwardly inclined straight slots 34 therein, such slots being aligned vertically and having their lower ends lying vertically beneath the lower ends of the L-shaped slots in the upper brackets. The slots 34 of the lower brackets are inclined at approximately the same angle as the major legs of the slots in the upper brackets, for example about 45°. A plurality of cross bolts 35, one for each slot 34, extend through slots 34 and through holes in the support post 16 received within the lower bracket.

The cross bolts 30 and 35 somewhat loosely and slidingly fit within the slots in the upper and lower brackets. When the fender is struck by an object at a location generally above the water line, the section of the fender thus struck (and adjacent sections of the fender to a somewhat lesser degree) is moved inwardly toward pier 20 and, because of the interaction of the cross bolts with the upwardly and inwardly inclined legs of the slots in the upper and lower brackets, is caused to be raised as it approaches the pier. The consequent raising of the heavy fender structure and the friction of the sliding connections dissipate much of the direct force of the impact, so that stop posts 21, if they are hit at all by the wales, sustain only a small proportion of the original blow. When the subject thus striking the fender moves away from the pier, the fender returns to its lowermost position, spaced outwardly of the face of the pier, in which the cross bolts at the upper and lower brackets lie at the lower ends of the respective slots in the side plates of such brackets.

When the fender is hit by an object in the water at or below the water line, the lower portion of the fender moves up and inwardly toward the face of the pier, while the upper portion of the fender moves upwardly and outwardly away from the face of the pier, being guided in such movement by the cross bolts 30 which slide upwardly and outwardly in the shorter legs 36, 37, and 38 of the L-shaped slots in the upper bracket. The different angles of such shorter legs 36, 37, and 38 of the L-shaped slots with respect to the horizontal are so chosen, for a fender having a particular configuration and size including the spacing of the upper and lower brackets from each other, as to provide for the combined upward and angular movement of the fender resulting from the fact that the lower portion of the fender moves upwardly and inwardly while the upper portion moves upwardly and outwardly. Thus the fender of the invention is substantially equally effective to cushion a blow thereagainst, whether the blow occurs above or below the water line. When the force below the water line is removed from the fender, the fender again resumes its normal "rest" position, in which the cross bolts lie at the lower ends of the slots in the upper and lower brackets.

As above indicated, the second embodiment of the fender of the invention, shown in Figs. 7–11, inclusive, is particularly of advantage for use with supports such as piers and the like having zones wherein the outer wall of the support changes direction fairly abruptly. This embodiment is thus applicable to corners of any angle.

Figure 7:
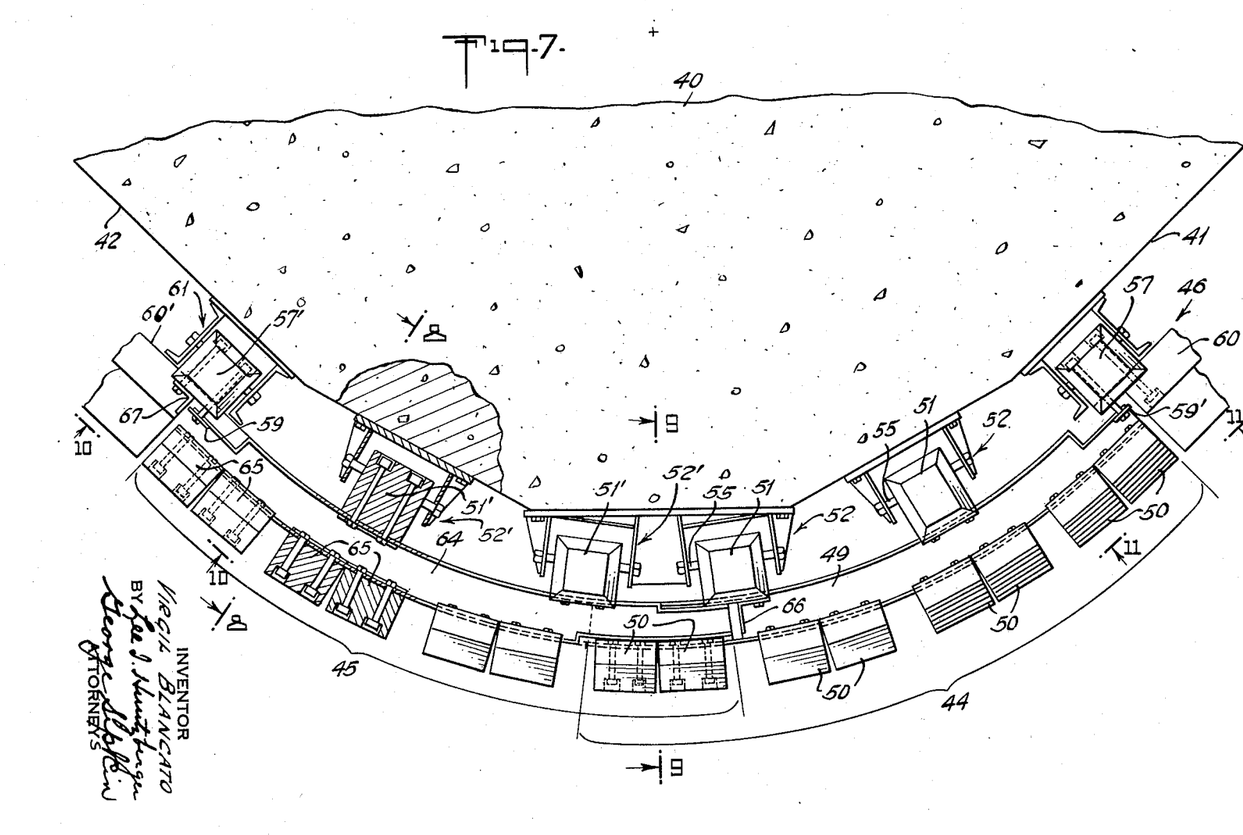
Figure 7 is a fragmentary view, partially in plan and partially in horizontal section, of a curved fender, made in accordance with a second embodiment of the invention, associated with the zone of intersection of two angularly disposed faces of a pier.

In Figure 7, there is shown a pier 40 having a first straight outer face 41 and a second straight outer face 42 lying at approximately 90° with respect to each other and a corner portion which may be curved but is shown as comprising three short vertically disposed sections of progressively varying angularity. The fender of Figure 7, which is supported on the outer face of pier 40, is composed of a first straight section 46, a first curved section 44, a second curved section 45, and a second straight section 47, the curved sections being adjacent each other and the straight sections lying adjacent the ends of the respective curved sections of the fender. In the fender of the second embodiment, the corner sections are not directly or rigidly connected to the sections adjacent thereto, but the longitudinally extending frame or wale members of each such section overlap at a certain degree at least one adjacent section and longitudinally acting stop means are provided between adjacent sections, so that inward or longitudinal forces are transmitted from the section of the fender which has been contacted by a ship or the like to at least one adjacent section of the fender in at least the latter portion of the travel of the contacted fender. As a result, the fender of this embodiment presents a substantially continuous outer contacting surface, the fender is flexible to a certain degree, so that each section thereof acts individually to a certain extent, but the several sections of the fender act together to absorb the force of a major impact.

Figure 8:
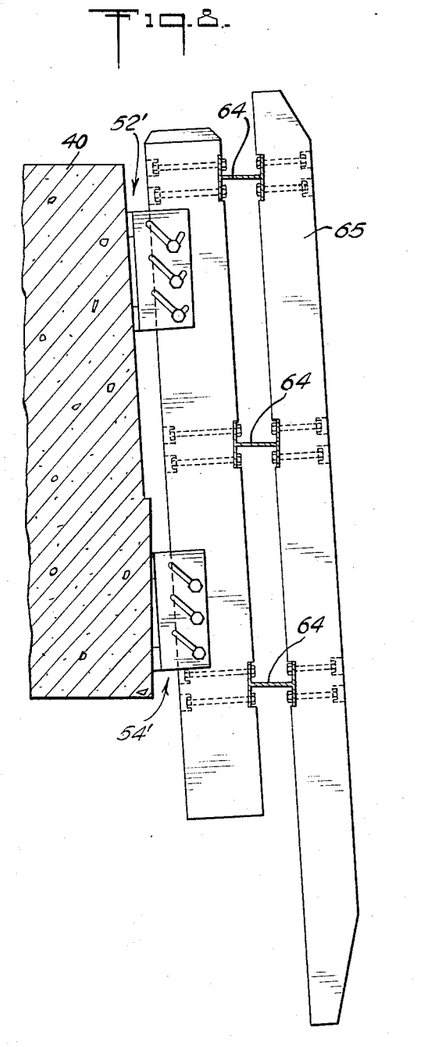
Figure 8 is a vertical section through the pier and fender of Figure 7, the section being taken along the line 8—8 of Figure 7.
Figure 9:
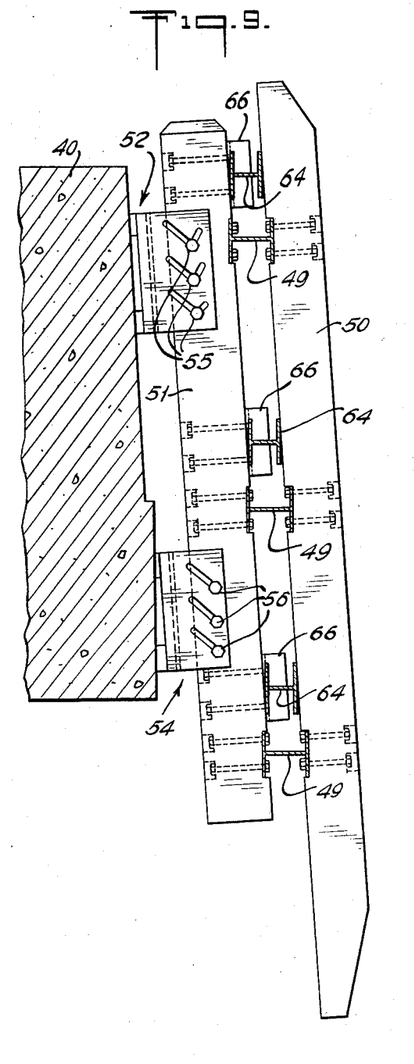
Figure 9 is a view in vertical section similar to Figure 8, the section being taken along the line 9—9 of Figure 7.

As indicated in Figure 7, curved section 44 extends throughout the distance indicated by the elongated curved bracket, and the second curved fender section 45 extends throughout the distance indicated by its elongated curved bracket, the two sections overlapping at their inner ends. Fender section 44 is made up of three vertically spaced similar arcuate wales 49 which extend throughout the length of the bracket 44 (Fig. 7). Wales 49, which are hereinafter designated the "lower wales," are shown as fabricated H beams. To the outer face of wales 49 there are attached a plurality of pairs of vertically extending contact or sheeting members 50 (eight members shown). To the inner faces of wales 49 there are attached spaced holding or support posts 51 which, in turn, are supported vertically or at a slight angle to the vertical, as shown in Figs. 8 and 9, by upper and lower fender-supporting brackets 52 and 54, respectively. Such brackets, which are substantially the same as brackets 17 and 19, respectively, of the first described embodiment except that their side plates are spaced more widely from the side faces of the support posts, have cross bolts 55 and 56, respectively, extending through the slots in their side plates and through the support post 51. It will be apparent that, when sheeting 50 of fender section 44 is contacted above the water line, the fender section as a whole will move upwardly and inwardly toward pier 40, and that when center section 44 is contacted by a body below the water line the lower end of the fender section will move inwardly and upwardly and the upper end thereof will move upwardly and outwardly from the pier.

Curved fender section 45 has three vertically spaced arcuate wales 64 which extend throughout the full length of the fender section designated by the curved bracket 45 in Fig. 7. Wales 64 are spaced from each other generally in the same amount as the "lower wales" 49, but wales 64, which are hereinafter designated the "upper wales," are each located above the respective lower wales 49, as shown in Figure 9. To the outer faces of upper wales 64 there are secured a plurality of pairs of contact or sheeting members 65. The outer sides of the circumferentially inner ends of the upper wales 64 are relieved radially somewhat throughout a circumferential extent exceeding somewhat the width of the last pair of sheeting members 50 on the lower wales, as shown in Figure 7. The inner sides of the circumferentially inner ends of upper wales 64 are also relieved somewhat in a radial direction so as to be slidable along the outer face of the more central of the two support posts 51. Thus the two arcuate sections 44 and 45 of the fender may move to a selected extent circumferentially with respect to each other without interference between their parts. By reason of the sliding reception of the circumferentially inner ends of the upper wales 64 between the outer face of the more central support post 51 and the inner or rear faces of the central sheeting members 50, the circumferentially inner ends of sections 44 and 45 are connected, with some play, for movement as a unit radially inwardly and outwardly of the pier.

As shown in Figures 7 and 8, the upper wales 64 are connected to slightly inclined support posts 51', which in turn are carried by slotted upper and lower brackets 52', and 54', which are similar to brackets 52 and 54. When the sheeting member 65 of section 45, therefore, are contacted by an object in the water, section 45 may move with respect to the pier 40 and with respect to section 44 in the same manner as described above in connection with section 44. The spacing of the side plates of the upper brackets 52 and 52' and of the respective lower brackets by a distance markedly exceeding the width of the supporting posts held thereby, as shown in Figure 7, allows sections 44 and 45 of the fender to move circumferentially of the pier to appreciable extents to accommodate the "contraction" of the curved portion of the fender system as the sections move inwardly.

Figure 10:
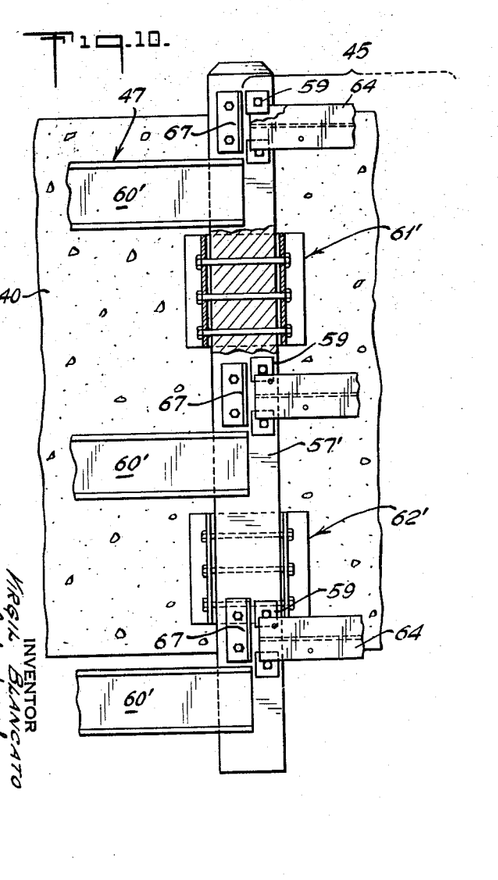
Figure 10 is a fragmentary view partially in elevation and partially in vertical section, the elevation being taken from a point of view of line 10—10 in Figure 7, the vertical contact members of the fender being omitted.
Figure 11:
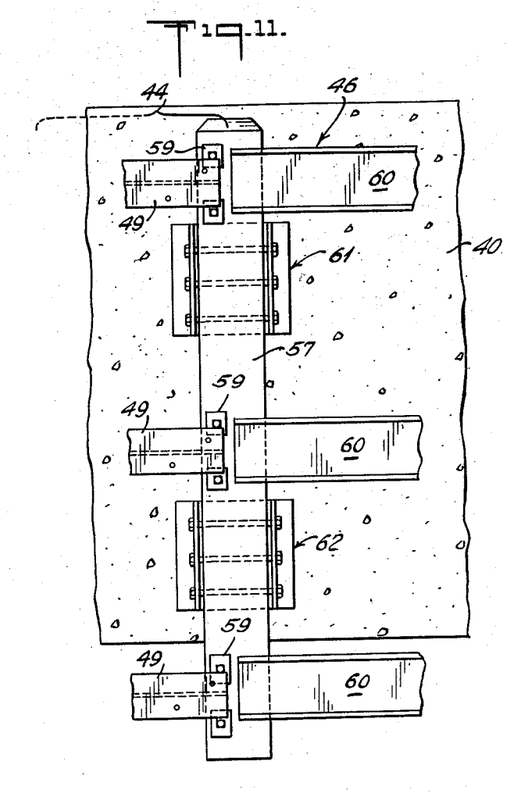
Figure 11 is a fragmentary view in elevation from the point of view of line 11—11 of Figure 7, the vertical contact members of the fender being omitted.

The manner of interconnection of the peripherally outer ends of curved sections 44 and 45 of the fender will be more readily apparent upon consideration of Figures 10 and 11. As shown, sections 46 and 47 have aligned straight wales 60 and 60', respectively, the ends of such wales being connected to support posts 57 and 57', respectively. The left-hand ends of upper wales 64 (Fig. 10) are connected to support posts 57' by clips or brackets 59 which permit the upper wales to slide in the direction of their length. Similar brackets 59' attach the right-hand ends of lower wales 49 (Fig. 11) to support post 57. Support post 57 is mounted in a slotted upper bracket 61 and in a slotted lower bracket 62. Support post 57' is mounted in a slotted upper bracket 61' and the slotted lower bracket 62'. Brackets 61, 61', and 62, 62' are similar to brackets 17 and 19, respectively, of the first described embodiment and the support posts are mounted by cross bolts extending through slots in the brackets as above described. As a result of such construction the circumferentially outer ends of the two curved sections of the fender and also the terminal ends of the straight sections thereon are mounted for movement inwardly toward the pier and upwardly thereof in substantially the same manner as the sections of the embodiment of the fender shown in Figs. 1–6, inclusive.

To prevent undue circumferential movement of the curved sections 44 and 45 with respect to each other, and to prevent the subjection of brackets 61, 61', 62, and 62' to unduly large sidewise forces, L-shaped stop members 66 are attached to the outer face of the innermost support post 51 at positions confronting the innermost end of each of the upper wales 64. In the normal, "rest" position of the two sections relative to each other, shown in Figure 7, stop 66 is somewhat spaced from the ends of the upper wales. Since the circumferentially outer ends of lower wales 49 are aligned with the ends of wales 60 (Fig. 11), the latter wales act as stops for the outer ends of the lower wales 49. As shown in Figure 10, however, the outer ends of upper wales 64 lie somewhat above the ends of wales 60'. For that reason, L-shaped stop members 67 are attached to the outer face of holding post 57' in alignment with the outer end of each of wales 64 and somewhat spaced therefrom when the sections of the fender are disposed as in Figure 7.

It will be apparent from the above that, should any of straight or curved sections of the fender of Figs. 7–11 be contacted with appreciable force on its outer face, such section will move, in general, upwardly and inwardly toward the outer face of the pier. Combined with such motion there may be some circumferential motion of the section, particularly if it is one of the curved sections which has received a glancing impact. After initial movement of one such curved section, it tends to move the circumferentially inner end of the other curved section in the same direction, by reason of the described overlap of the upper and lower wales and the reception of the circumferentially inner ends of the upper wales between the support post and the sheeting at the inner end of the other section. Circumferential movement of one or more of the curved sections is likewise eventually transmitted, after a predetermined amount of lost motion, to the other curved section or to the adjacent straight sections by reason of the abutment of the ends of the wales against the described stop members on the other section or against the ends of the wales on the other section. Consequently, after initial travel of the section which has been first contacted, the other adjacent sections of the fender cooperate to yield and further to absorb the force of the impact.

Figure 12:
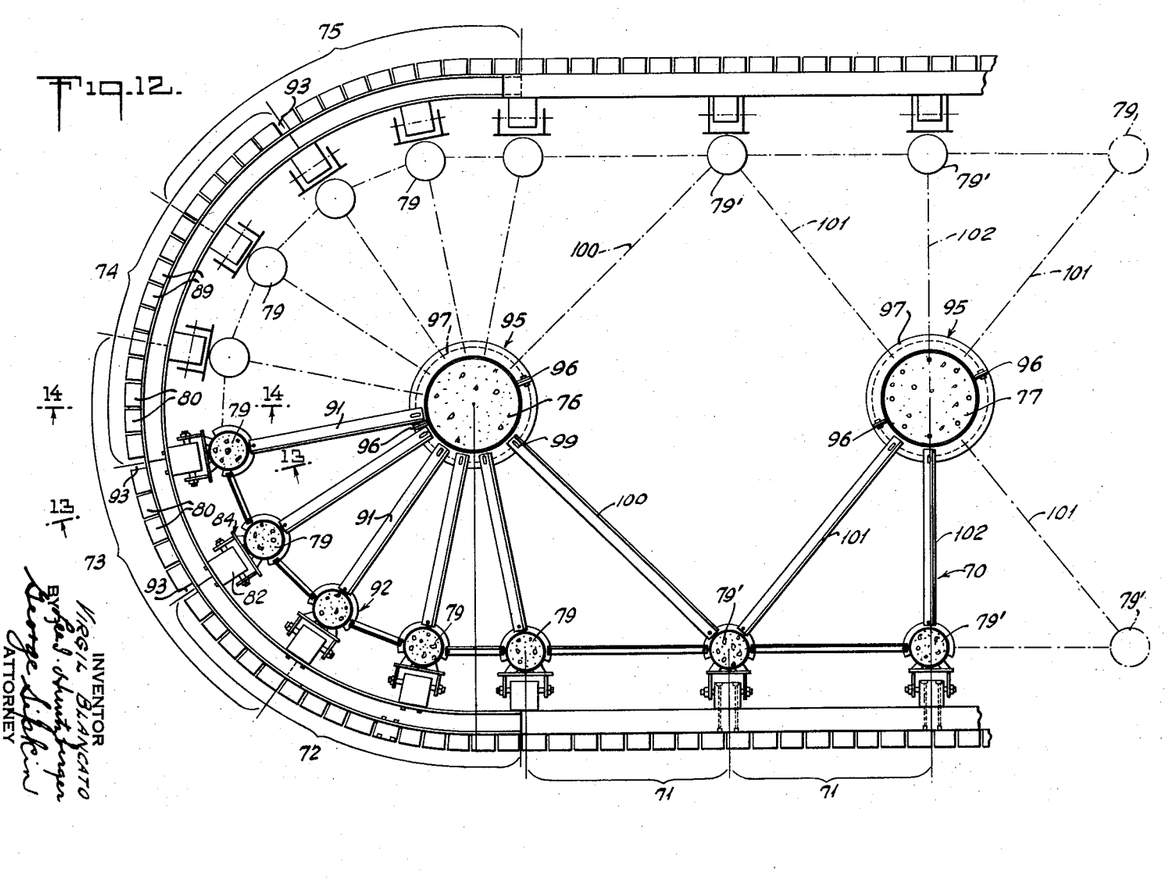
Figure 12 is a fragmentary view in plan of a third embodiment of the fender of the invention, the view showing the curved end of a slip and portions of the side walls of the slip connected to such curved end.

The third disclosed embodiment of the fender of the invention, shown in Figs. 12–15, inclusive, is of particular advantage when employed on a slip such as the ferry slip generally designated 70 in Figure 12. The fender of slip 70 is made up of a plurality of serially connected straight sections 71, and of a plurality of curved sections 72, 73, 74, and 75. In the embodiment shown, each such curved section is made in the form of a portion of a circle, and subtends an angle of approximately 45°. It will be understood that such angle may be varied appreciably as desired, a practical upper limit being in the neighborhood of 50°. The curved sections of the fender are of overlapping construction, generally similar to the sections 44 and 45 of the second embodiment, above described. Straight sections 71 may either be of similar overlapping construction, or they may be constructed in a manner similar to the embodiment of Figs. 1–6, inclusive.

In the embodiment shown, the slip includes a plurality of spaced large central piles of which two are shown at 76 and 77. Such piles are in the form of driven metal tubes filled with concrete. Pile 76 is positioned at the center of the curved end portion of the slip, and pile 77 is positioned midway between the straight side walls of the slip. A plurality of smaller piles 79 are angularly spaced about pile 76 at generally equally radial distances therefrom as shown. Further small piles 79' are positioned in lines inwardly of, spaced from, and parallel to the respective side walls of the slip.

Figure 13:
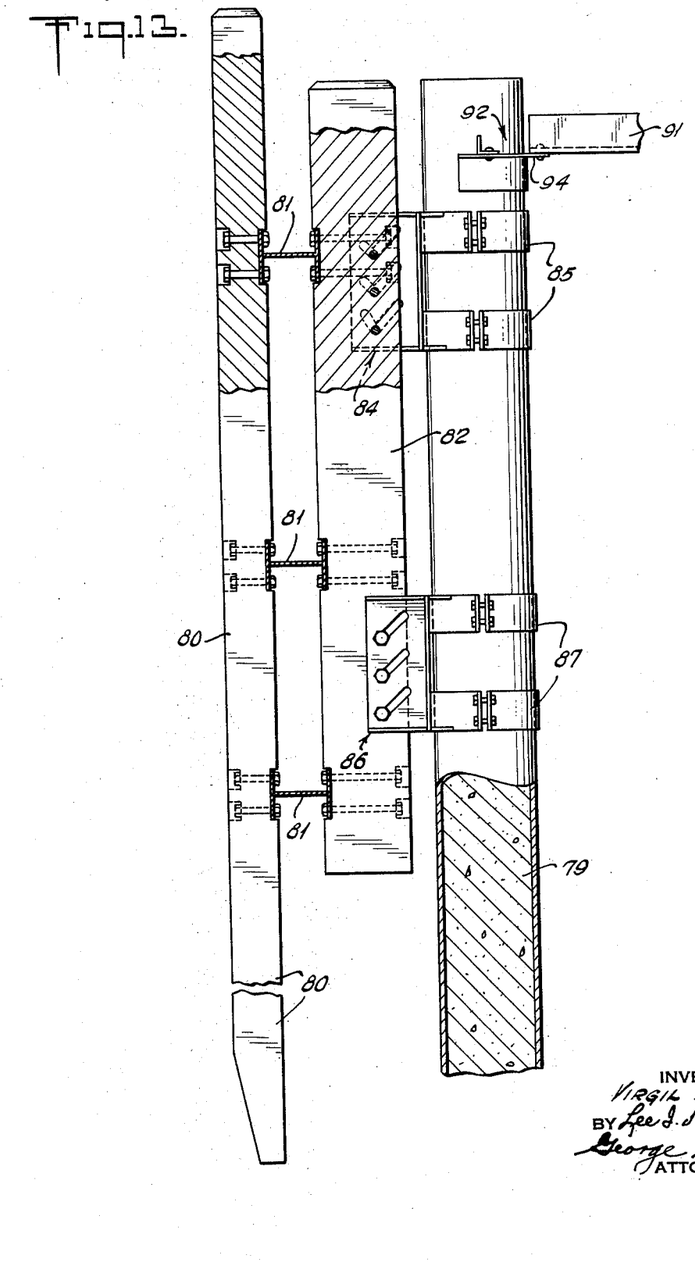
Figure 13 is a view in vertical section through the fender of Figure 12, parts of the fender and of its support being shown in elevation, the section being taken along the line 13—13 of Figure 12.
Figure 14:
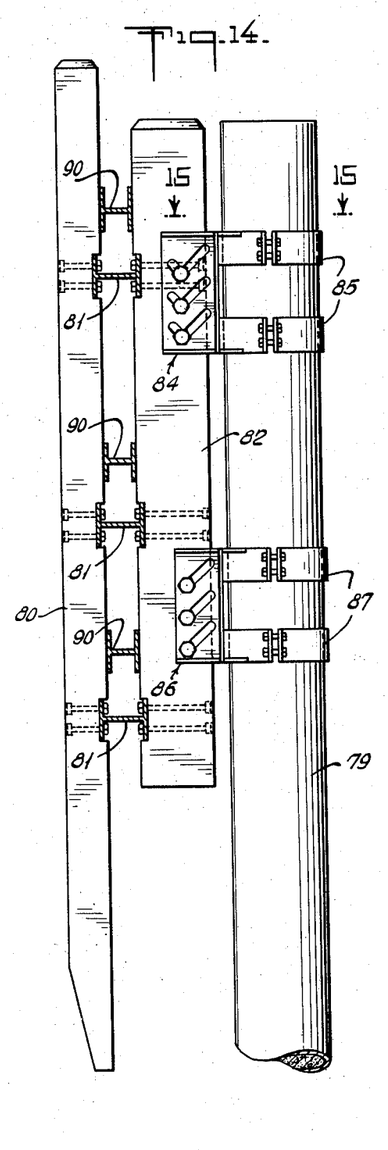
Figure 14 is a view in vertical section through the fender of Figure 12, certain of the parts being shown in elevation, the section being taken along the line 14—14 of Figure 12.
Figure 15:
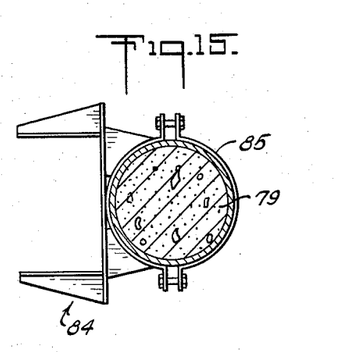
Figure 15 is a fragmentary section through a supporting pile for the fender of Figure 12, the section being taken along the line 15—15 of Figure 14, an upper fender-supporting bracket connected to such pier being shown in plan.

The construction of the arcuate sections of the fender, and their manner of attachment to the outer small piles 79, will be more readily apparent upon consideration of Figs. 13 and 14, which show details of construction of curved fender sections 73 and 74, respectively. In the construction shown, successive curved sections of the fenders have wales which are vertically staggered with respect to those of the adjacent sections. Thus, sections 72 and 74 have upper wales, and sections 73 and 75 have lower wales. Successive sections are slidably and loosely radially connected for joint movement in the same manner as the curved sections in the second described embodiment of the fender. As shown in Figure 13, curved section 73 of the fender has a plurality of vertically spaced curved circumferentially extending lower wales 81, to the outer faces of which are secured a plurality of vertical sheeting members 80. The inner faces of the wales 81 are connected to a vertical holding or support post 82. Support post 82 is mounted in an upper slotted bracket 84 and in a lower slotted bracket 86. Brackets 84 and 86 are similar, respectively, to brackets 17 and 19 of the first embodiment, and the support posts are mounted in the brackets in similar manner. Brackets 84 and 86 are connected to the upper end of pile 79 by split clamping members 85 and 87, respectively, which are bolted together about the pile.

Figure 14 shows a portion of curved fender section 73 at the end thereof at which it overlaps the adjacent curved section 74. As shown in this figure, the ends of the upper wales 90 of section 74 are of reduced width, do not carry any vertical contact or sheeting members, and are slidably received between the inner faces of sheeting members 80 of section 73 and the outer face of the supporting post 82. The overlapping and slidable wales of adjacent curved sections of the fender thus loosely connect the sections together and cause the transmission of forces in a radial direction from one to the other. To allow for the effective shortening of the circumference of the curved portion of the fender under such action, spaces 93 between the confronting adjacent sheeting members on adjacent sections of the fender are provided.

Piles are connected to central pile 76 by a plurality of angle iron compression members 91 disposed in spoke-like formation about the latter. A fitting 92 connected to the upper end of each pile 79 has a horizontal flange 94 thereon, to which the outer end of each of the members 91 is connected as by a bolt, as shown in Figure 13. A circular fitting 95 made in two parts and bolted around pile 76 has a flange 97 thereon. The inner end of each brace member 91 is longitudinally slotted at 99 as shown, and receives through the slot a vertical bolt which also extends through flange 97. Each of the first small outer piles 79' are connected to pile 76 in a similar manner by a long brace member 100. Such first small piles 79' and the remainder of the piles 79' are similarly connected to the further large central pile member 77 by angularly disposed braces 101 and transversely disposed braces 102. Members 101 and 102 constitute a truss-like connection between the larger central inner piles and the smaller outer piles, thereby securely but yieldably connecting them together. It will be understood that the slip may incorporate a number of central piles 77 and outer piles 79' connected thereto in the manner shown, depending on the length of the slip.

When one of the curved fender sections or one of the straight fender sections is hit by an object such as a ferry, the fender section itself first yields to move inwardly toward the small piles and generally upwardly thereon. Upon further travel of such fender section, it transmits its motion to adjacent sections thereof to lift and move them inwardly, and thus further to absorb the energy of the impact. When the fender sections reach the terminus of their travel relative to the small piles, if the blow is sufficiently hard, the small piles 79 or 79' themselves will yield inwardly somewhat. When the permissible motion allowed by the slotted connection 99 has been taken up, braces 91, 100, 101, and 102, as the case may be, are then placed under compression and the large central piles 76 and/or 77 back up the small piles which are affected, thereby to prevent undue bending of the latter. When the body causing the impact moves away from the slip, the inherent resiliency of the piles 79, 79', 76 and 77 restores them to their substantially unstressed condition, and the movable fender sections return to their lowermost, rest positions.

It will be understood that any desired number of curved fender sections may be used according to the structure to be protected. For example a complete circle of such sections may be arranged to protect a bridge pile, beacon or other structure. By suitably combining curved sections and straight sections as illustrated by way of example in the second and third embodiments a structure of virtually any shape can be effectively protected. The radius of arcuate sections can be varied to suit the curvature of the supporting structure but is preferably not less than four feet.

Whereas for purposes of illustration I have shown and described preferred embodiments of the marine pier fender of the invention, it will be understood that such embodiments are illustrative only since the invention is capable of considerable variation as to details. The invention is to be defined therefore by the appended claims.

It will be apparent from the above that the fender of the invention is simple, rugged, and easily maintained. Replacement of a broken contact or sheeting member or of a wale is simple, as the replacement is substantially confined to the broken member above. In contrast thereto, the removal of a broken wale in a conventional fender requires the removal of three or four bents of the fender.

Obviously many modifications and variations of the present invention are possible in the light of the above teachings. It is therefore to be understood that within the scope of the appended claims the invention may be practised otherwise than as specifically described.

What I claim and desire to secure by Letters Patent is:

1. A shock-absorbing structure comprising a fixed support structure, a heavy vertically disposed fender having a substantial length in a horizontal direction and means mounting said fender on said support structure, said mounting means comprising a plurality of fender mounting devices arranged in sets which are spaced along the length of the fender, each of said sets comprising a plurality of said devices which are spaced vertically from each other, each of said fender-mounting devices comprising at least one cam track inclined upwardly toward said support structure and a cam track follower coacting therewith and connecting the fender to the support structure, said cam tracks of the fender-mounting devices of each of said sets being generally parallel, said cam tracks being provided with fender-supporting means for said cam track followers to limit downward movement of the fender relative to said support structure, said fender-mounting devices guiding the fender for movement in an inclined path inwardly toward the support structure and upwardly against the action of gravity under impact by a body on said fender.

2. A shock-absorbing structure according to claim 1, in which the cam track of a fender-mounting device has spaced parallel sides and the coacting follower is disposed between said sides.

3. A shock-absorbing structure comprising a fixed support structure, a heavy vertically disposed fender having a substantial length in a horizontal direction and means mounting said fender on said support structure, said mounting means comprising a plurality of fender-mounting devices arranged in sets which are spaced along the length of the fender, each of said sets comprising a pair of said devices spaced vertically from each other, each of said fender-mounting devices comprising at least a first cam track inclined upwardly and inwardly toward said support structure and a cam track follower coacting with said track and connecting the fender to the support structure, said cam tracks of the upper and lower fender mounting device of a set being generally parallel, and the upper fender-mounting device of each set having a second cam track connected to and extending upwardly and outwardly from the lower end of said first cam track of said upper mounting device, said mounting devices guiding the fender for movement inwardly toward said support structure and upwardly against the action of gravity upon impact in a direction toward the support structure and above said lower mounting devices, and guiding the fender for movement of its lower portion inwardly toward said support structure and movement of its upper portion outwardly away from the support structure while the fender as a whole moves upwardly against the action of gravity upon impact in a direction toward the support structure and below said lower mounting devices.

4. A shock-absorbing marine structure comprising a generally vertical fixed support structure, a heavy vertically disposed fender extending along said support structure and comprising a plurality of serially arranged sections and mechanisms for mounting said fender sections on said support structure comprising a plurality of fender-mounting devices arranged in sets, at least two longitudinally spaced sets of said devices connecting each section of the fender to the support structure, each set comprising a plurality of said devices spaced vertically from each other, each of said fender-mounting devices comprising coacting parts connected to said fender and support structure respectively and comprising a cam track inclined upwardly and inwardly toward said support structure and a cam follower movable along said track to guide the fender for translatory movement inwardly toward the support structure and upwardly against the action of gravity under the force of an impact of a floating body, means limiting downward movement of said fender sections relative to said support structure, and means interconnecting adjacent end portions of successive fender sections so that the force of an impact on one section is transmitted in part to an adjacent section.

5. A marine structure according to claim 4, in which each of said fender sections comprises a plurality of longitudinally-extending vertically spaced wales, a plurality of vertically extending contact members affixed on the outer faces of the wales and a plurality of vertically-extending longitudinally spaced support posts affixed on the inner faces of said wales, said mounting devices being affixed to said support posts.

6. A marine structure according to claim 5, in which the wales of two successive fender sections are disposed at different heights and have their end sections overlapping each other.

7. A marine structure according to claim 4, in which at least one of said fender sections is curved in a longitudinal direction.

8. A marine structure according to claim 4, in which at least one of said fender sections is curved in a longitudinal direction and at least another of said sections is straight.

9. A marine structure according to claim 4, in which coacting means is provided on adjacent end portions of successive fender sections to limit relative longitudinal movement between said sections.

10. A shock-absorbing marine structure comprising a generally vertical fixed support structure, a heavy vertically disposed fender comprising a plurality of arcuate sections disposed end-to-end and mechanism for mounting said fender sections on said support structure, said mechanism comprising a plurality of fender-mounting devices arranged in sets, at least two longitudinally spaced sets of said devices connecting each fender section to the support structure, each set comprising a plurality of said devices spaced vertically from each other, each of said fender-mounting devices comprising coacting parts connected to said fender and support structure respectively and comprising a cam track inclined upwardly and inwardly toward said support structure and a cam follower movable along said track to guide the fender for translatory movement inwardly toward the support structure and upwardly against the action of gravity under the force of an impact of a floating body and means limiting downward movement of said fender relative to said support structure.

11. A marine structure according to claim 10, in which said support structure comprises a main pile, a plurality of outer piles spaced therefrom and located to define the general outline of the structure, said fender-mounting devices being carried by said outer piles to mount said fender sections on said outer piles and compression members extending between said main pile and outer piles and connecting said piles with a lost motion connection permitting the outer piles to yield a selected amount upon impact before the compression members transmit the force of such impact to the main pile.

12. A marine structure according to claim 10, in which successive fender sections are slidably interconnected with one another.

References Cited in the file of this patent
UNITED STATES PATENTS

| | | |
|---|---|---|
| 1,013,584 | Brunnier | Jan. 2, 1912 |
| 1,089,745 | Brunnier | Mar. 10, 1914 |
| 2,039,151 | Dubois | Apr. 28, 1936 |
| 2,391,612 | Baker | Dec. 25, 1945 |
| 2,417,849 | Walters et al. | Mar. 25, 1947 |

FOREIGN PATENTS

| | | |
|---|---|---|
| 1,524 | Great Britain | 1884 |
| 1,031,969 | France | 1953 |
| 1,047,001 | France | 1953 |
| 1,095,038 | France | Dec. 15, 1954 |

OTHER REFERENCES

Budocks Technical Digest No. 57, pages 3–6, June 1955.